(12) United States Patent
Oyabu

(10) Patent No.: US 10,319,401 B1
(45) Date of Patent: Jun. 11, 2019

(54) MAGNETIC DISK DEVICE AND CONTROL METHOD FOR MAGNETIC DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Hiroshi Oyabu, Fujisawa Kanagawa (JP)

(73) Assignees: Kabushiki Kaisha Toshiba, Tokyo (JP); Toshiba Electronics Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/124,819

(22) Filed: Sep. 7, 2018

(30) Foreign Application Priority Data

Feb. 27, 2018 (JP) ................................. 2018-033219

(51) Int. Cl.
*G11B 5/54* (2006.01)
*G11B 5/60* (2006.01)
*G11B 5/31* (2006.01)
*G11B 5/48* (2006.01)

(52) U.S. Cl.
CPC ............ *G11B 5/607* (2013.01); *G11B 5/3133* (2013.01); *G11B 5/4826* (2013.01)

(58) Field of Classification Search
CPC ... G11B 5/607; G11B 5/09; G11B 2005/0021; G11B 5/6011; G11B 5/6052; G11B 5/6088; G11B 21/12; G11B 7/131; G11B 7/129; G11B 7/1374; G11B 5/54; G11B 5/58; G11B 5/66; G11B 5/3909; G11B 5/314; G11B 5/02; G11B 5/024
USPC ................... 360/75, 48; 369/120, 121, 44.37
See application file for complete search history.

(56) References Cited

U.S. PATENT DOCUMENTS

| | | | |
|---|---|---|---|
| 7,468,854 B2 * | 12/2008 | Yamashita | G11B 5/6005 360/31 |
| 9,620,162 B1 | 4/2017 | Haralson | |
| 2007/0053104 A1 | 3/2007 | Satoh et al. | |
| 2008/0068739 A1 | 3/2008 | Oyamada et al. | |
| 2016/0267933 A1 | 9/2016 | Akiya | |

FOREIGN PATENT DOCUMENTS

JP 2008-071417 A 3/2008

* cited by examiner

*Primary Examiner* — Nabil Z Hindi
(74) *Attorney, Agent, or Firm* — White & Case LLP

(57) ABSTRACT

A magnetic disk device according to an embodiment includes: a head slider; a magnetic head provided in the head slider; a heater provided in the head slider; and a controller that determines, in seek operation of the magnetic head, a preheat start scheduled position from a remaining seek distance at which a time required for preheating of the head slider can be secured, the controller starting the preheating from the preheat start scheduled position in a case where no bump exists in an area from the preheat start scheduled position to a seek target position, the controller changing a preheat start position to an arbitrary position in an area from the bump to the seek target position in a case where the bump exists in the area from the preheat start scheduled position to the seek target position.

20 Claims, 6 Drawing Sheets

US 10,319,401 B1

MAGNETIC DISK DEVICE AND CONTROL METHOD FOR MAGNETIC DISK DEVICE

CROSS-REFERENCE TO RELATED APPLICATIONS

This application is based upon and claims the benefit of priority from Japanese Patent Application No. 2018-033219, filed on Feb. 27, 2018; the entire contents of which are incorporated herein by reference.

FIELD

An embodiment described herein relates generally to a magnetic disk device and a control method for a magnetic disk device.

BACKGROUND

In a magnetic disk device, dynamic flying height (DFH) control is sometimes performed. In the DFH control, magnetic spacing of a magnetic head from a magnetic disk is adjusted by energizing a heater mounted on a head slider and thermally expanding the head slider. In the magnetic disk device, preheating of the head slider is started from a position several tracks before a target track, for example.

DETAILED DESCRIPTION

A magnetic disk device according to an embodiment includes: a head slider; a magnetic head provided in the head slider; a heater provided in the head slider; and a controller that determines, in seek operation of the magnetic head, a preheat start scheduled position from a remaining seek distance at which a time required for preheating of the head slider can be secured, the controller starting the preheating from the preheat start scheduled position in a case where no bump exists in an area from the preheat start scheduled position to a seek target position, the controller changing a preheat start position to an arbitrary position in an area from the bump to the seek target position in a case where the bump exists in the area from the preheat start scheduled position to the seek target position.

In the following, the present invention will be described in detail with reference to the drawings. Note that the present invention is not limited to the embodiment described below. Additionally, constituent elements in the following embodiment include those easily conceivable by a man skilled in the art or those substantially identical.

Embodiment

A magnetic disk device according to an embodiment and modified examples thereof will be described with reference to FIGS. 1 to 9.

Figure 1:
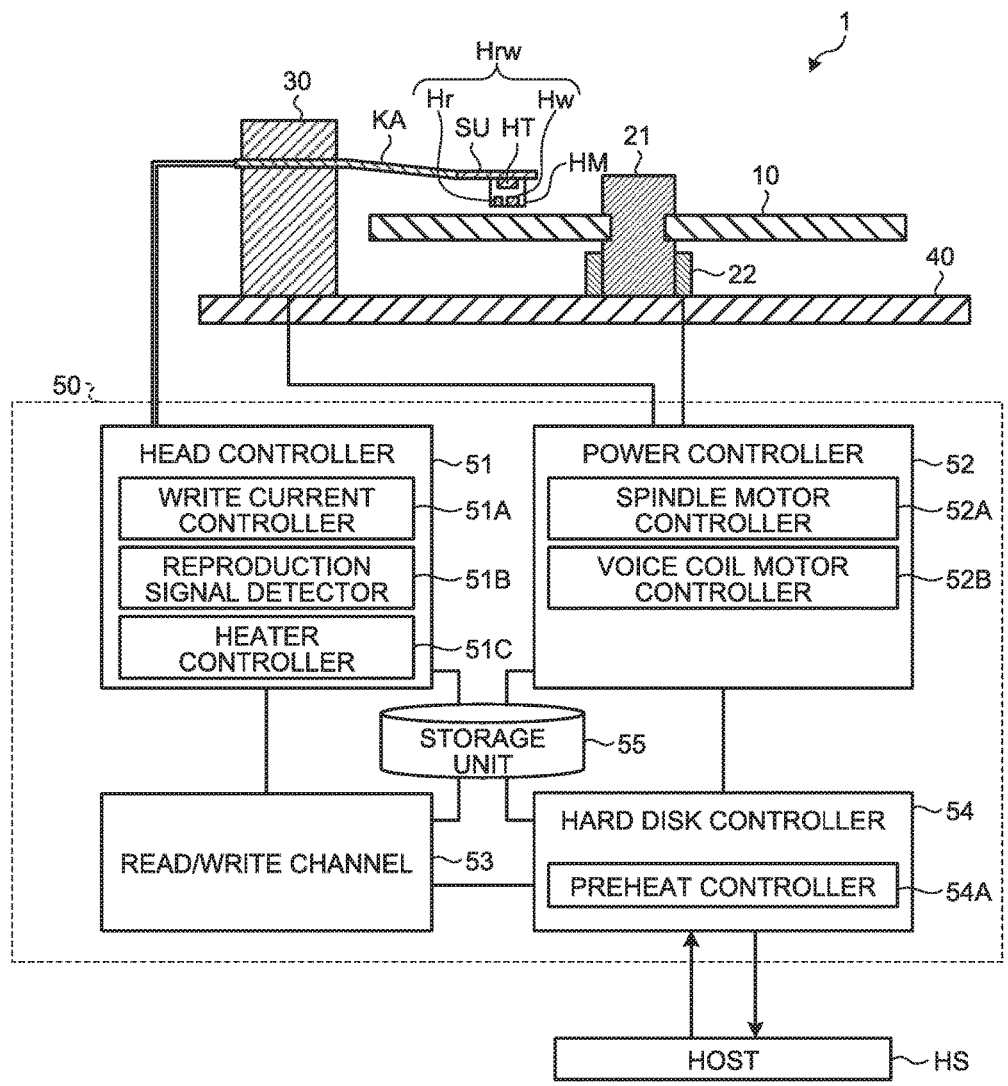
FIG. 1 is a diagram illustrating an entire configuration of a magnetic disk device according to an embodiment.

(Exemplary Configuration of Magnetic Disk Device) FIG. 1 is a diagram illustrating an entire configuration of a magnetic disk device 1 according to an embodiment. The magnetic disk device 1 is, for example, a hard disk drive or the like externally attached to a host HS or built therein.

The magnetic disk device 1 includes a magnetic disk 10, a spindle 21, a spindle motor 22, a head slider HM, a suspension SU, a carriage arm KA, a voice coil motor 30, a base 40, and a controller 50.

The magnetic disk 10 is a disk-shaped recording medium that magnetically records various kinds of information, and is rotationally driven by the spindle motor 22. The magnetic disk 10 has a plurality of concentric circular tracks (not illustrated) around a rotation center of the spindle motor 22 or a helical single track (not illustrated). In each track, a plurality of data areas and a plurality of servo areas (both not illustrated) are alternately provided in a circumferential direction. Note that the magnetic disk 10 may include a bump (abnormal protrusion) in some cases.

The head slider HM is arranged above the magnetic disk 10. The head slider HM is provided with a magnetic head Hrw. The magnetic head Hrw includes a read head Hr and a write head Hw. The magnetic head Hrw is arranged at a flying position about 10 nm from the magnetic disk 10 in a manner facing the magnetic disk 10. Additionally, the head slider HM is provided with a heater HT to heat the head slider HM. The head slider HM is thermally expanded when heated by the heater HT, and a flying height of the magnetic head Hrw from the magnetic disk 10 is controlled.

The head slider HM is held above the magnetic disk 10 via the suspension SU and the carriage arm KA. The carriage arm KA makes the head slider HM slide in a horizontal plane during seek operation or the like. The suspension SU applies, to the magnetic head Hrw, pushing force against the flying force of the magnetic head Hrw by an air flow during rotation of the magnetic disk 10, thereby keeping a constant flying height of the magnetic head Hrw above the magnetic disk 10. The suspension SU is formed of, for example, a leaf spring.

The voice coil motor 30 drives the carriage arm KA. The spindle motor 22 rotates the magnetic disk 10 around the spindle 21. The voice coil motor 30 and the spindle motor 22 are fixed to the base 40.

The controller 50 includes a head controller 51, a power controller 52, a read/write channel 53, a hard disk controller 54, and a storage unit 55, and controls the respective units of the magnetic disk device 1. With this configuration, the controller 50 controls a radial position of the magnetic head Hrw with respect to the magnetic disk 10 on the basis of, for example, servo data (servo area data) read by the read head Hr.

The head controller 51 includes a write current controller 51A, a reproduction signal detector 51B, and a heater controller 51C, and amplifies or detects a signal at the time of recording/reproduction. The write current controller 51A controls write current flowing in the write head Hw. The reproduction signal detector 51B detects a signal read by the read head Hr. The heater controller 51C controls on/off of the heater HT.

The power controller 52 includes a spindle motor controller 52A and a voice coil motor controller 52B, and drives the spindle motor 22 and the voice coil motor 30. The spindle motor controller 52A controls rotation of the spindle motor 22. The voice coil motor controller 52B controls driving of the voice coil motor 30.

The read/write channel 53 exchanges data between the head controller 51 and the hard disk controller 54. The data includes read data, write data, and servo data. For example, the read/write channel 53 converts a signal reproduced by the read head Hr into a data format handled by the host HS, or converts data output from the host HS into a signal format recorded by the write head Hw. Additionally, the read/write channel 53 applies decoding processing to a signal reproduced by the read head Hr, or applies code modulation to data output from the host HS.

The hard disk controller 54 performs, for example, recording/reproducing control on the basis of a command from the host HS, and exchanges data between the host HS and the read/write channel 53. Additionally, the hard disk controller 54 includes a preheat controller 54A. The preheat controller 54A controls preheating of the head slider HM executed during seek operation. Details of the function of the preheat controller 54A will be described later.

The storage unit 55 stores: various kinds of setting parameter groups necessary for operation of the magnetic disk device 1; and positional information of a bump included in the magnetic disk 10. The positional information of a bump is, for example, information obtained in advance in an inspection process on the magnetic disk 10.

The controller 50 is connected to the host HS. The host HS may be a personal computer that issues a write command, a read command, or the like to the magnetic disk device, or may be a network connectable to a server or the like.

In the magnetic disk device 1 thus configured, while the magnetic disk 10 is rotated by the spindle motor 22, a signal is read from the magnetic disk 10 via the magnetic head Hrw and detected by the reproduction signal detector 51B. The signal detected by the reproduction signal detector 51B is converted into data by the read/write channel 53, and then transmitted to the hard disk controller 54. In the hard disk controller 54, tracking control for the magnetic head Hrw is performed on the basis of servo data included in the signal detected by the reproduction signal detector 51B.

Additionally, a present position of the magnetic head Hrw is calculated on the basis of the servo data detected by the reproduction signal detector 51B, and the seek control is performed such that the magnetic head Hrw approaches a target position (seek target position). During seek operation of the magnetic head Hrw, the head slider HM is preheated by the heater HT, and a distance between the magnetic head Hrw and the magnetic disk 10 is adjusted. When the magnetic head Hrw reaches the seek target position, a signal is read from the magnetic disk 10 via the magnetic head Hrw, or data is written in the magnetic disk 10.

(Function of Preheat Controller)

Figure 2:
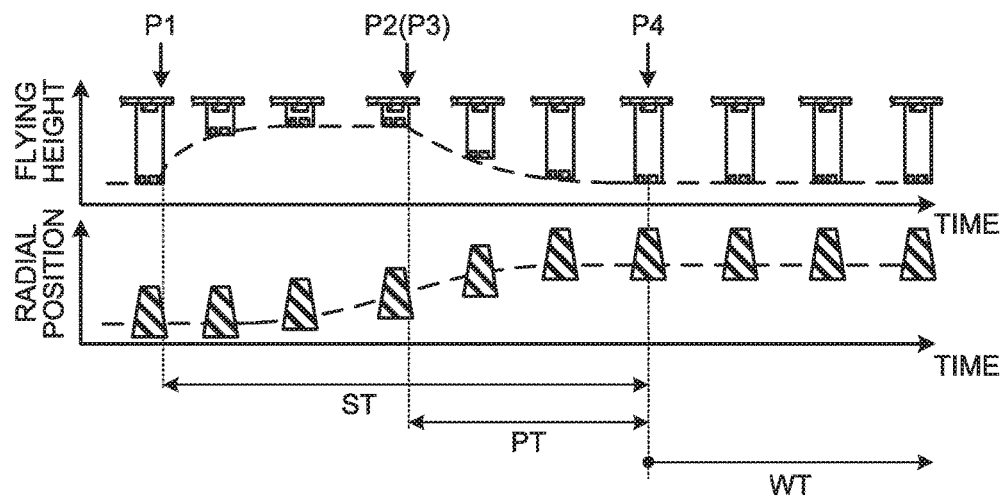
FIG. 2 is a diagram illustrating a preheat sequence in the magnetic disk device according to the embodiment.

Next, the function of the preheat controller 54A will be described with reference to FIGS. 2 and 3. FIG. 2 is a diagram illustrating a preheat sequence in the magnetic disk device 1 according to the embodiment. An upper part of FIG. 2 is a diagram illustrating a flying height of the magnetic head Hrw from the magnetic disk 10. A lower part of FIG. 2 is a diagram illustrating a radial position of the magnetic head Hrw on the magnetic disk 10.

When operation of the magnetic head Hrw based on a latest command is finished, the hard disk controller 54 calculates a seek orbit and a seek time ST of the magnetic head Hrw from a present position P1 of the magnetic head Hrw and a seek target position P4 based on a next command. The seek orbit is a path when the magnetic head Hrw is moved from the present position P1 to the seek target position P4. Meanwhile, the present position P1 and the seek target position P4 of the magnetic head Hrw represent radial positions on the magnetic disk 10. The similar is also applied to each of positions P2, P3, and the like.

The preheat controller 54A calculates a preheat start scheduled position P2 from the seek orbit and the seek time ST calculated by the hard disk controller 54. As the preheat start scheduled position P2, a position having a remaining seek distance at which a time required for preheating PT can be secured is calculated. The time required for preheating PT is, for example, a time required until thermal expansion of the magnetic head Hrw is saturated and the magnetic head Hrw becomes a state of not expanding any further. By determining the preheat start scheduled position P2 as described above, preheating can be finished within the seek time ST.

The hard disk controller 54 refers to the storage unit 55 and determines whether any bump exists between the preheat start scheduled position P2 calculated by the preheat controller 54A and the seek target position P4. The example of FIG. 2 illustrates a case where no bump exists.

As illustrated in FIG. 2, in a case where no bump exists, the hard disk controller 54 causes the preheat controller 54A to start preheating by setting the preheat start scheduled position P2 at a preheat actual start position P3. In other words, the preheat controller 54A causes the heater controller 51C to turn on the heater HT of the head slider HM to preheat the head slider HM. Consequently, the head slider HM is thermally expanded so as to adjust magnetic spacing to appropriate spacing before the magnetic head Hrw reaches the seek target position P4. The magnetic spacing is a distance between the magnetic head Hrw and the magnetic disk 10 during data writing.

The magnetic head Hrw having reached the seek target position P4 becomes a writing enabled state, that is, a state in which writing can be performed. A time thereafter is a rotation waiting time WT of the magnetic disk 10.

Subsequently, a case where a bump exists will be described with reference to FIG. 3.

Figure 3:
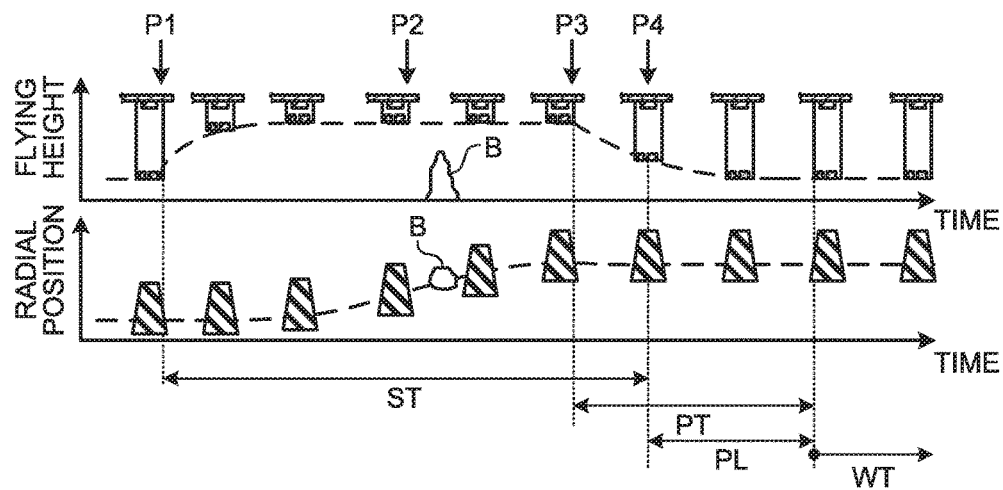
FIG. 3 is a diagram illustrating a preheat sequence in the magnetic disk device according to the embodiment.

FIG. 3 is a diagram illustrating a preheat sequence in the magnetic disk device 1 according to the embodiment in the case where a bump B exists. The upper part of FIG. 3 illustrates a flying height of the magnetic head Hrw from the magnetic disk 10. The lower part of FIG. 3 illustrates a radial position of the magnetic head Hrw in the magnetic disk 10.

As illustrated in FIG. 3, in the case where the bump B exists, the hard disk controller 54 causes the preheat controller 54A to start preheating not from the preheat start scheduled position P2 calculated by the preheat controller 54A but from a position several tracks before the seek target, for example. Consequently, even in a case where the head slider HM is expanded by preheating, the head slider HM is prevented from hitting the bump B. However, since a preheat actual start position P3 is displaced more to a radial position on the seek target side than the start scheduled position P2, preheating is not finished within the seek time ST, and a preheat waiting time PL is generated.

After the preheat time PT is finished and the preheat waiting time PL elapses, the magnetic head Hrw having waited at the seek target position P4 becomes the writing enabled state.

(Control Processing for Magnetic Disk Device)

Figure 4:
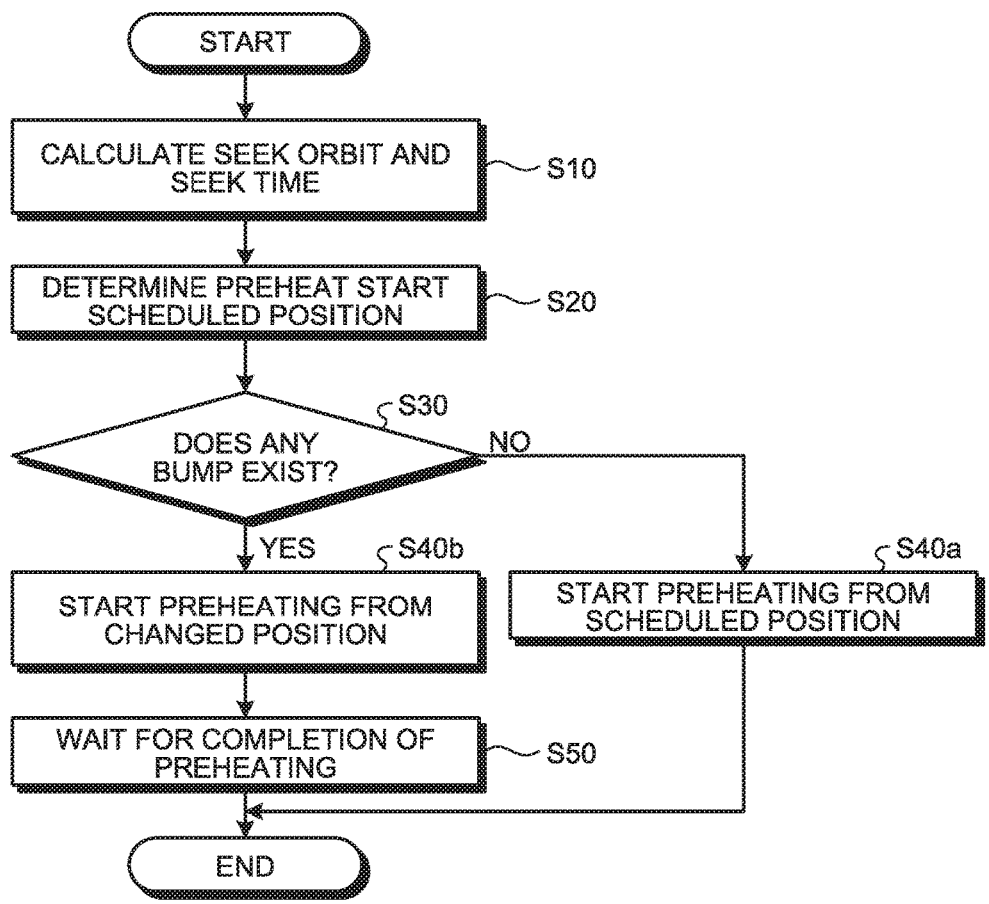
FIG. 4 is a flowchart illustrating exemplary procedures of control processing in the magnetic disk device according to the embodiment.

Next, control processing in the magnetic disk device 1 will be described with reference to FIG. 4. FIG. 4 is a flowchart illustrating exemplary procedures of the control processing in the magnetic disk device 1 according to the embodiment.

As illustrated in FIG. 4, the hard disk controller 54 calculates a seek orbit and a seek time ST in step S10. In step S20, the preheat controller 54A determines a preheat start scheduled position P2. In step S30, the hard disk controller 54 determines whether any bump B exists in an area from the preheat start scheduled position P2 to a seek target position P4.

Here, seek operation of the magnetic head Hrw is started at any timing from finishing step S10 to finishing step S30.

When no bump exists B in step S30 (No), the preheat controller 54A causes the heater controller 51C to start preheating from the preheat start scheduled position P2 in step S40a. When a bump B exists (Yes), the preheat controller 54A starts preheating from a changed preheat start position P3, for example, a position several tracks before the seek target in step S40b, and the hard disk controller 54 waits for completion of preheating in step S50.

Thus, the control processing in the magnetic disk device 1 is finished.

Figure 5:
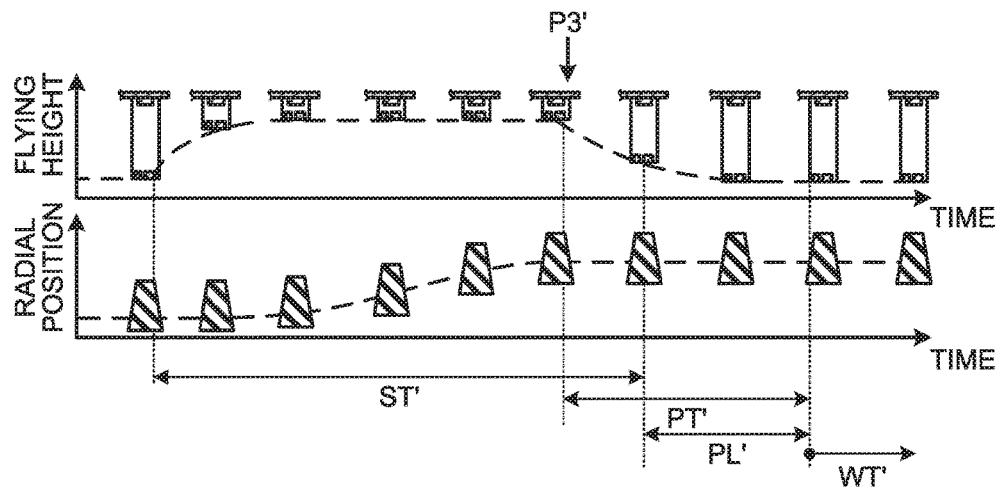
FIG. 5 is a diagram illustrating a preheat sequence in a magnetic disk device according to a comparative example.

Here, a preheat sequence executed in a magnetic disk device according to a comparative example will be described with reference to FIG. 5 in order to describe effects of the magnetic disk device 1 of the embodiment. FIG. 5 is a diagram illustrating the preheat sequence in the magnetic disk device according to the comparative example.

As illustrated in FIG. 5, in the magnetic disk device of the comparative example, a preheat start position P3' is determined without considering a time required for preheating and existence of a bump. For example, the preheat start position P3' is consistently a position several tracks before a seek target, or the like. Therefore, depending on a preheat time PT', preheating is not finished within a seek time ST', and a preheat waiting time PL' may be generated.

In a conventional magnetic disk device, a time required for preheating is sufficiently short, and preheating can be almost surely finished within a seek time. However, in recent years, capacity of a magnetic disk is increased, and closer magnetic spacing is required. Due to such a situation, the preheat time is prolonged by waiting for thermal expansion of a head slider.

Here, in the case of simply prolonging the preheat time, existence of a bump may become an issue. In other words, in a case where a bump exists on the magnetic disk, the magnetic head that has been thermally expanded during preheating may hit the bump because of the prolonged preheat time. In this case, the magnetic head or the magnetic disk may be damaged.

In the magnetic disk device 1 of the embodiment, the preheat actual start position P3 is determined considering the time required for preheating PT. Consequently, in the case where no bump B exists, preheating can be started earlier than in the conventional technique, and preheating can be finished within the seek time ST. Accordingly, more efficient preheat control can be performed.

Furthermore, in the magnetic disk device 1 of the embodiment, the preheat actual start position P3 is determined considering not only the time required for preheating PT but also existence of a bump B. In the case where the bump B exists on the magnetic disk 10, ten tracks to several tens of tracks before and after the bump B are preliminarily designated as use prohibited areas. Since the preheat start position P3 is determined at the position several tracks before the seek target in the case where the bump B exists, preheating can be started while avoiding the bump B even in a case where the seek target is located near a boundary of the use prohibited area designated due to the bump B. As a result, it is possible to prevent the thermally-expanded magnetic head Hrw from hitting the bump B and damaging the magnetic disk 10. Consequently, quality as the magnetic disk 10 and the magnetic disk device 1 can be maintained.

First Modified Example

Next, a description will be provided for a magnetic disk device according to a first modified example of the embodiment. The magnetic disk device of the first modified example differs from the above embodiment in that: in a case where a preheat waiting time is generated due to a bump, such a waiting time is set as one of calculation conditions in reordering.

The reordering means to efficiently perform command processing by reordering commands in a command queue when the magnetic disk device receives a plurality of commands from the host. There are several conditions to be considered at the time of reordering, and a seek time is one of such conditions.

In the magnetic disk device of the first modified example, when a preheat waiting time is generated due to a bump, this preheat waiting time is also added to the conditions to be considered at the time of reordering. Specifically, for example, a more distant track is designated as a seek target, and the magnetic head is moved to this track during the preheat waiting time, or the like.

Consequently, even when the preheat waiting time is generated, efficiency degradation can be suppressed.

Second Modified Example

Figure 6:
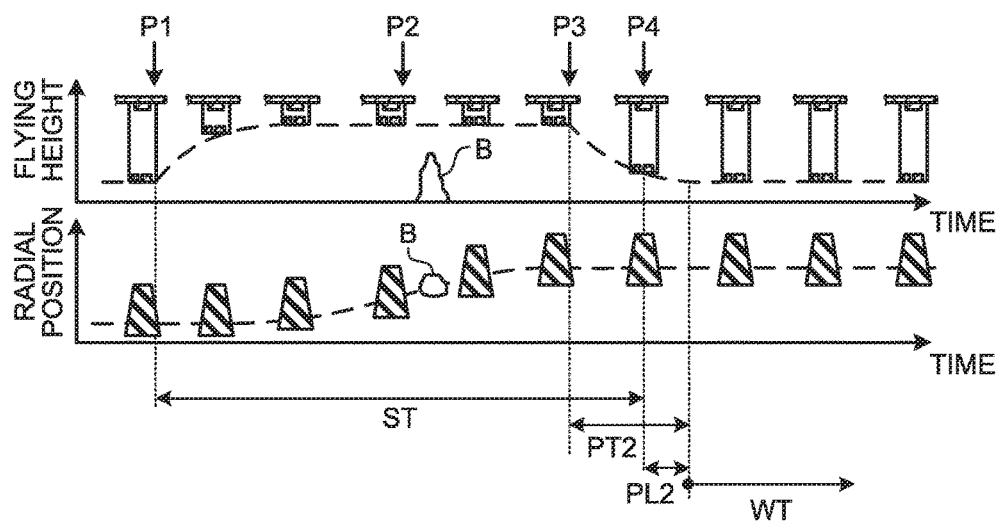
FIG. 6 is a diagram illustrating a preheat sequence in a magnetic disk device according to a second modified example of the embodiment.

Next, a description will be provided for a magnetic disk device according to a second modified example of the embodiment with reference to FIG. 6. The magnetic disk device of the second modified example differs from the above-described embodiment in that a time required for preheating is changed in accordance with a relation between a flying height of the magnetic head and a bit error rate in data writing.

The bit error rate in data writing depends on the flying height of the magnetic head. In other words, when preheating of the head slider is not sufficient and before thermal expansion is saturated, the flying height of the magnetic head becomes higher than an appropriate height, and the bit error rate in data writing is increased.

However, there may be a case where specification of the bit error rate in data writing is moderate depending on contents of a command. In this case, the time required for preheating can be estimated shorter than usual. In other words, in the magnetic disk device of second modified example, when writing is performed with low specification of the bit error rate, for example, preheating can be finished without waiting until thermal expansion of the head slider is completely saturated, and the writing enabled state can be obtained.

The state is illustrated in FIG. 6. FIG. 6 is a diagram illustrating a preheat sequence in the magnetic disk device according to the second modified example of the embodiment. As illustrated in FIG. 6, even when the bump B exists, a preheat waiting time PL2 can be shortened by a shortened preheat time PT2.

Third Modified Example

Figure 7:
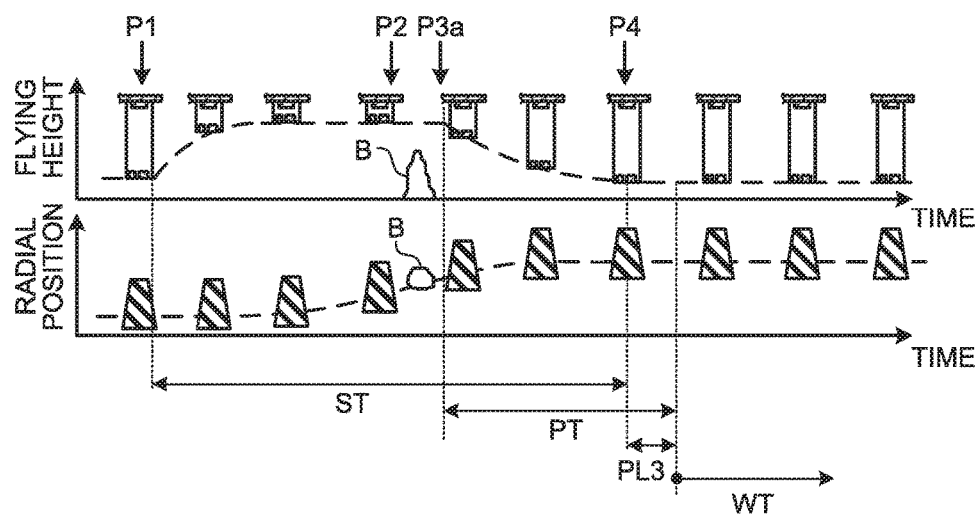
FIG. 7 is a diagram illustrating a preheat sequence in a magnetic disk device according to a third modified example of the embodiment.

Next, a description will be provided for a magnetic disk device according to a third modified example of the embodiment with reference to FIG. 7. FIG. 7 is a diagram illustrating a preheat sequence in the magnetic disk device according to the third modified example of the embodiment. The magnetic disk device of the third modified example differs from the above-described embodiment in that a preheat start position P3a is not set at a position several tracks before the seek target or the like but is changed in accordance with a position of a bump B.

In other words, as illustrated in FIG. 7, in the magnetic disk device of the third modified example, preheating is started at a predetermined radial position after passing an existing position of the bump B. The predetermined position is, for example, a radial position several tracks after the bump B.

Consequently, even in the case where the bump B exists, preheating can be started earlier than the magnetic disk device 1 of the above-described embodiment in which preheating is started at a position several tracks before the seek target. As a result, a preheat waiting time PL3 can be shortened and efficiency degradation can be suppressed.

Fourth Modified Example

Figure 8:
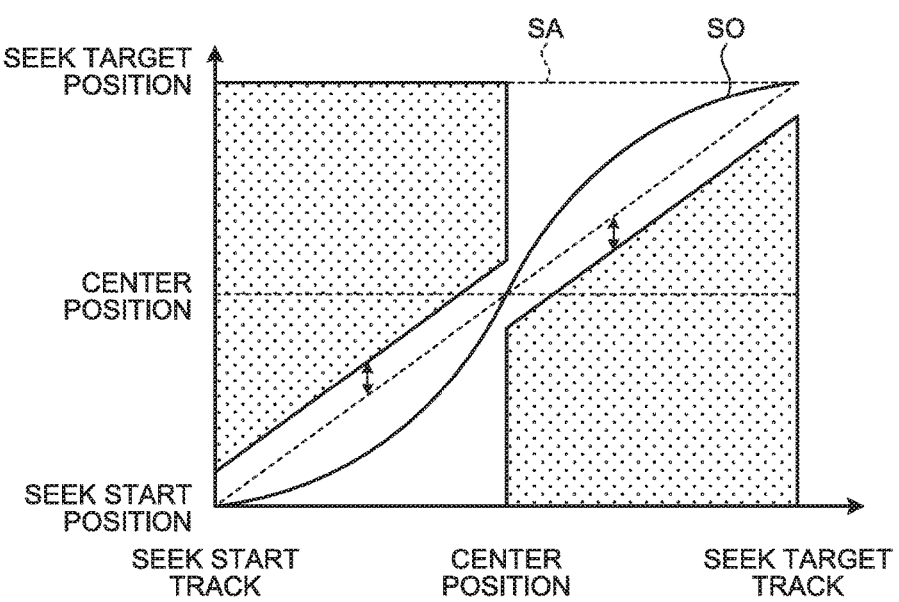
FIG. 8 is a diagram illustrating a seek orbit and a seek area in the magnetic disk device according to a fourth modified example of the embodiment.
Figure 9:
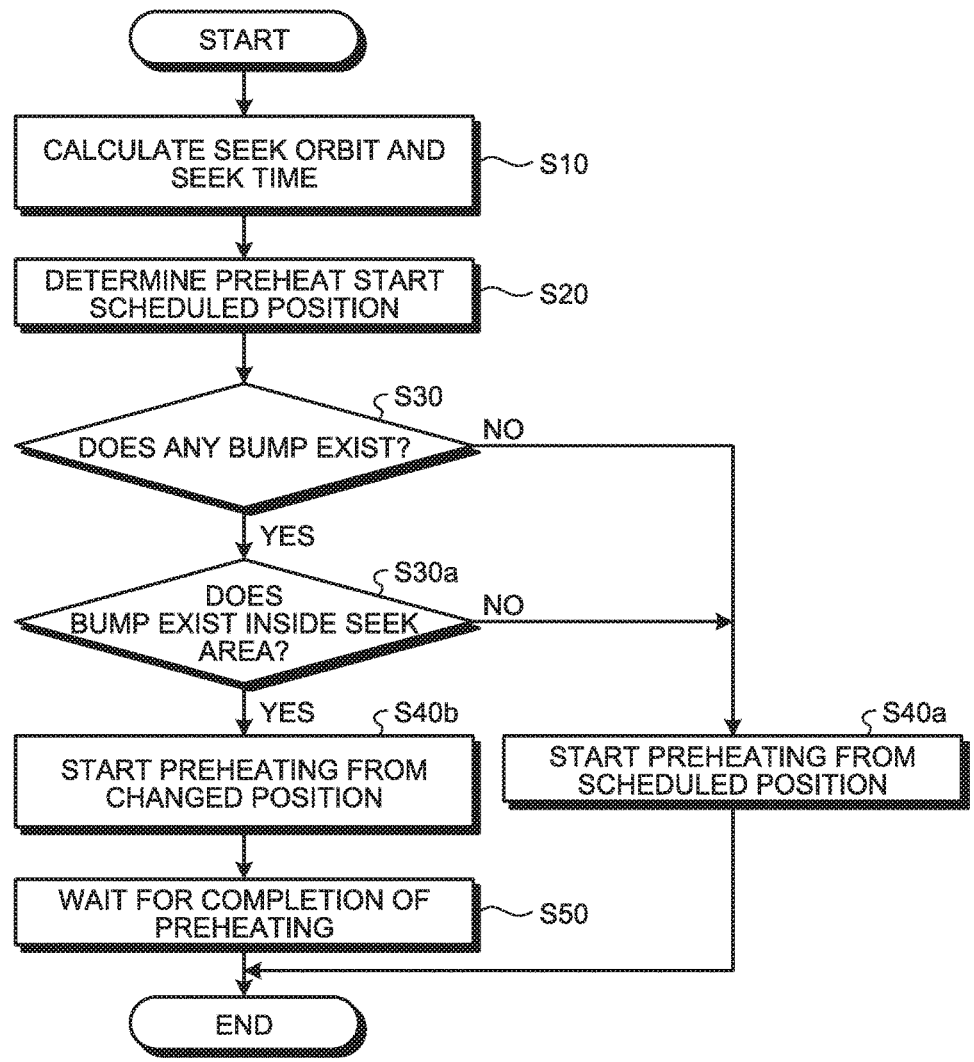
FIG. 9 is a flowchart illustrating exemplary procedures of control processing in the magnetic disk device according to the fourth modified example of the embodiment.

Next, a description will be provided for a magnetic disk device according to a fourth modified example of the embodiment with reference to FIGS. 8 and 9. FIG. 8 is a diagram illustrating a seek orbit SO and a seek area SA in the magnetic disk device according to the fourth modified example of the embodiment. FIG. 9 is a flowchart illustrating exemplary procedures of control processing in the magnetic disk device according to the fourth modified example of the embodiment. The magnetic disk device of the fourth modified example differs from the above-described embodiment in determining a preheat start position in accordance with a more detailed position of a bump.

As described above, the hard disk controller 54 first calculates the seek orbit of the magnetic head Hrw. As illustrated in FIG. 8, in the fourth modified example, the hard disk controller 54 further calculates the seek area SA on the basis of the seek orbit SO. The seek area SA is an area including the seek orbit SO and also is an area having a margin of a predetermined distance with respect to a bump. In other words, in a case where a bump exists outside this seek area SA, there is an extremely little possibility that preheated magnetic head Hrw hits the bump.

Therefore, as illustrated in FIG. 9, in the case where the bump exists, the hard disk controller 54 determines whether the bump exists inside the seek area SA in step S30a. When a bump exists outside the seek area SA (No), preheating is started from a preheat start scheduled position calculated by the preheat controller 54A in a manner similar to when no bump exists.

Consequently, the preheated magnetic head Hrw can be suppressed from hitting the bump, a preheat waiting time can be eliminated, and more efficient preheat control can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a head slider;
   a magnetic head provided in the head slider;
   a heater provided in the head slider; and
   a controller that determines, in seek operation of the magnetic head, a preheat start scheduled position from a remaining seek distance at which a time required for preheating of the head slider can be secured, the controller starting the preheating from the preheat start scheduled position in a case where no bump exists in an area from the preheat start scheduled position to a seek target position, the controller changing a preheat start position to an arbitrary position in an area from the bump to the seek target position in a case where the bump exists in the area from the preheat start scheduled position to the seek target position.

2. The magnetic disk device according to claim 1, wherein the controller adds, as one of calculation conditions of reordering, a preheat time generated after finishing a seek time in the case where the bump exists.

3. The magnetic disk device according to claim 2, wherein the controller performs reordering so as to allocate, to a moving time of the magnetic head, a preheat time generated after finishing the seek time in the case where the bump exists.

4. The magnetic disk device according to claim 1, wherein the controller changes the time required for preheating in accordance with a relation between a flying height of the magnetic head and a bit error rate in data writing.

5. The magnetic disk device according to claim 4, wherein the controller shortens the time required for preheating in a case where specification of the bit error rate is moderate.

6. The magnetic disk device according to claim 1, wherein the controller sets, to a position before the seek target position, the preheat start position in the case where the bump exists.

7. The magnetic disk device according to claim 1, wherein the controller changes the preheat start position in accordance with a position of the bump.

8. The magnetic disk device according to claim 7, wherein the controller starts the preheating at a predetermined position after passing a position where the bump exists.

9. The magnetic disk device according to claim 1, wherein, even in the case where the bump exists in the area from the preheat start scheduled position to the seek target position, the controller determines whether to start the preheating from the preheat start scheduled position in accordance with a relation between a seek orbit of the magnetic head and a position of the bump.

10. The magnetic disk device according to claim 9, wherein the controller starts the preheating from the preheat start scheduled position in a case where the bump exists outside an area calculated from the seek orbit of the magnetic head.

11. A control method for a magnetic disk device, the method comprising:
   determining, in seek operation of a magnetic head, a preheat start scheduled position from a remaining seek distance at which a time required for preheating of a head slider including the magnetic head can be secured; and
   starting the preheating from the preheat start scheduled position in a case where no bump exists in an area from the preheat start scheduled position to a seek target position, and changing a preheat start position to an arbitrary position in an area from the bump to the seek target position in a case where the bump exists in the area from the preheat start scheduled position to the seek target position.

12. The control method for a magnetic disk device according to claim 11, comprising adding, as one of calculation conditions of reordering, a preheat time generated after finishing a seek time in the case where the bump exists.

13. The control method for a magnetic disk device according to claim 12, comprising performing reordering so as to allocate, to a moving time of the magnetic head, a preheat time generated after finishing the seek time in the case where the bump exists.

14. The control method for a magnetic disk device according to claim 11, comprising changing the time required for preheating in accordance with a relation between a flying height of the magnetic head and a bit error rate in data writing.

15. The control method for a magnetic disk device according to claim 14, comprising shortening the time required for preheating in a case where specification of the bit error rate is moderate.

16. The control method for a magnetic disk device according to claim 11, comprising setting, to a position before the seek target position, the preheat start position in the case where the bump exists.

17. The control method for a magnetic disk device according to claim 11, comprising changing the preheat start position in accordance with a position of the bump.

18. The control method for a magnetic disk device according to claim 17, comprising starting the preheating at a predetermined position after passing a position where the bump exists.

19. The control method for a magnetic disk device according to claim 11, comprising determining whether to start the preheating from the preheat start scheduled position in accordance with a relation between a seek orbit of the magnetic head and a position of the bump even in the case where the bump exists in the area from the preheat start scheduled position to the seek target position.

20. The control method for a magnetic disk device according to claim 19, comprising starting the preheating from the preheat start scheduled position in a case where the bump exists outside an area calculated from the seek orbit of the magnetic head.

* * * * *